United States Patent [19]

Korosi et al.

[11] 3,865,828
[45] Feb. 11, 1975

[54] PYRIDINE DERIVATIVES HAVING ANTIDEPRESSANT ACTIVITY

[75] Inventors: Jeno Korosi; Gabriella Szabo Nee Czibula; Lay Nee Konya, Aranka; Lujza Erdelyi Nee Petocz; Bolya Balla Nee Kosoczky; Eniko Kiszelly, all of Budapest, Hungary

[73] Assignee: EGYT Gyogyszervegyeszeti Gyar, Budapest, Hungary

[22] Filed: Nov. 1, 1972

[21] Appl. No.: 302,891

Related U.S. Application Data

[63] Continuation-in-part of Ser. No. 236,953, March 22, 1972, abandoned.

[52] U.S. Cl... 260/268 C, 260/295 R, 260/295 AM, 424/250
[51] Int. Cl............................................. C07d 51/70
[58] Field of Search...... 260/268 C, 295 R, 295 AM

[56] References Cited
UNITED STATES PATENTS

| | | | |
|---|---|---|---|
| 3,223,708 | 12/1965 | Mod et al. | 260/268 C |
| 3,284,453 | 11/1966 | Tomcufcik et al. | 260/268 C |
| 3,532,742 | 10/1970 | Weber et al. | 260/268 C |

FOREIGN PATENTS OR APPLICATIONS

| | | |
|---|---|---|
| 1,364,605 | 5/1964 | France |

OTHER PUBLICATIONS

Ueda et al., Chemical Abstracts, Vol. 59, p. 1603d, (1963).

Symchowicz et al., Chemical Abstracts, Vol. 70, 80846p, (1969).

*Primary Examiner*—Donald G. Daus
*Assistant Examiner*—Jose Tovar
*Attorney, Agent, or Firm*—Young and Thompson

[57] ABSTRACT

Pyridine derivatives of the formula

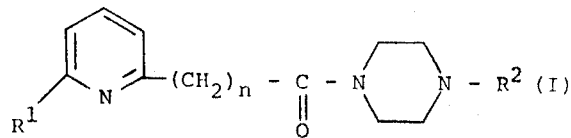

and their therapeutically acceptable acid addition salts, wherein $R^1$ is a member selected from the group consisting of hydrogen and methyl, $R^2$ is a member selected from the group consisting of hydrogen, alkali metal, alkyl containing from 1 to 3 carbon atoms, alkyl substituted with hydroxyl and containing from 1 to 3 carbon atoms, benzyl and benzyl substituted with halogen, and n is 0 to 1.

The new compounds of formula I are valuable anti-depressant agents.

3 Claims, No Drawings

PYRIDNE DERIVATIVES HAVING ANTIDEPRESSANT ACTIVITY

This application is a continuation-in-part of our co-pending application Ser. No. 236,953, filed Mar. 22, 1972 now abandoned.

This invention relates to new pyridine derivatives and the therapeutically acceptable acid addition salts thereof.

The new compounds according to the invention have the following formula

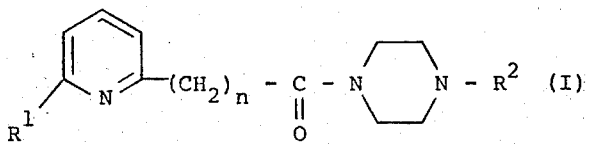

wherein $R^1$ is a hydrogen atom or a methyl group, $R^2$ is a hydrogen or an alkali metal atom, an alkyl group containing from 1 to 3 carbon atoms, an alkyl group containing from 1 to 3 carbon atoms and substituted with a hydroxyl group, a benzyl group or a benzyl group substituted with a halogen atom, and $n$ is 0 to 1.

The new compounds having the formula I and their therapeutically acceptable acid addition salts can be prepared in compliance with the process according to the invention by reacting a pyridine derivative having the formula II

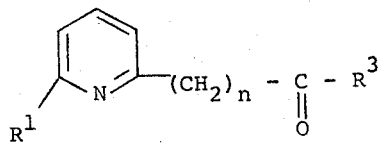

wherein $R^1$ and n have the same meanings as above and $R^3$ stands for a halogen atom, a hydroxyl group, an amino group or a straight or branched-chain alkoxy group containing from 1 to 4 carbon atoms, or a therapeutically acceptable acid addition salt thereof with a piperazine derivative having the formula

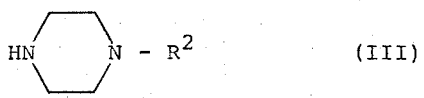

wherein $R^2$ has the same meaning as above, or a therapeutically acceptable acid addition salt thereof, and if desired, the obtained compound of formula I containing a hydrogen atom as the substituent $R^2$, is transformed to a compound of formula I containing an alkali metal atom as the substituent $R^2$. This compound can be transformed, if desired, by reacting with alkylating or aralkylating agents to a compound of formula I containing an alkyl group having from 1 to 3 carbon atoms or an alkyl group containing from 1 to 3 carbon atoms and substituted with a hydroxyl group, a benzyl group or a benzyl group substituted with a halogen atom as substituent $R^2$.

If the obtained compound of formula I is a free base, it can be converted into a therapeutically acceptable acid addition salt by reacting it with a therapeutically acceptable acid or, if desired, the acid addition salt can be transformed in a known way into the free base by reacting it with a strong base, or the acid addition salt can be transformed into another acid addition salt by reacting it with another therapeutically acceptable acid.

The free bases having the formula I can be purified before forming the salts preferably by recrystallization or vacuum distillation but the crude bases of formula I can also be used for the salt formation.

If compounds of the formula II, wherein $R^3$ stands for a hydroxyl, amino or alkoxy group containing from 1 to 4 carbon atoms, are used as starting material, these compounds are preferably reacted at a temperature of 140°–250°C. with the compounds of formula III. The reaction can be carried out in the absence of any solvent or in the presence of a solvent of higher boiling point, such as ethyleneglycol, formamide, dimethylformamide, benzylalcohol, or diphyl, which is the eutectic mixture of diphenyl and diphenyl ether, e.g. "Dowtherm A."

If during the preparation of the compounds of formula I one starts from compounds of formula II containing a halogen atom as the $R^3$ substituent, then the reaction is preferably carried out at 0°–100°C., in the absence of any solvent or in a neutral solvent, such as ether, dioxane, benzene or carbon tetrachloride.

The starting materials having the formulas II and III are known compounds (U.S. Pat. No. 2,415,785; J. Chem. Soc. 1927, 47; 1959, 3634; C.A. 45, 5954 (1951); 47, 617 (1953)).

The new compounds according to the invention have proved to be antidepressant agents of considerable therapeutical value. Compounds of similar structure are described in the technical literature at a single site (Pharmacia (Bucharest) 10, 35, 81 (1962); C.A. 58, 522, 11359 (1963)). The known compounds have been prepared by reacting N-methyl-piperazine and nicotinic or isonicotinic acid chloride, and their cardiovascular effect has been investigated. According to our own tests these known compounds have no appreciable antidepressant effect.

The new compounds of formula I show according to pharmacological tests a strong tetrabenazine- and reserpineantagonizing effect.

The effects and toxicity data of the dihydrochlorides of the compounds having the formula I are summarized in Table 1. The corresponding data of the known 5-(gamma-dimethylaminopropylidene)-dibenz(a,d)1,4-cycloheptadiene (Amitryptilin) having antidepressant effect are given for comparison. The tests have been carried out on mice. The compounds have been given orally.

Table 1

| Compound (No. of Example) | $LD_{50}$ mg/kg | $ED_{50}$ mg/kg Tetrabenazine-antagonizing effect | Reserpine-antagonizing effect |
|---|---|---|---|
| 1 or 2 | 3000 | 22.5 | 200 |
| 3 | 3000 | 60 | >400 |
| 4 or 5 | 860 | 25 | 39 |
| 6 | 3000 | 17 | 190 |
| 7 | 3000 | 15 | >400 |
| 8 | 3000 | 11 | 200 |
| 9 | 3000 | 18 | 200 |
| 10 | 700 | 12.5 | 12 |
| 11 | 360 | 30 | 30 |
| 12 | 680 | 70 | 47 |
| 13 | 435 | 20 | >100 |
| 14 | 1100 | 23.5 | 108 |
| Amitryptilin | 185 | 13 | 65 |

The therapeutical index ($LD_{50}/ED_{50}$) of a part of the compounds having the formula I is more favorable and is in some cases by orders of magnitude higher than that of the compound used for comparison. Moreover, the compounds of formula I have catalepsy-inhibiting, local anaesthetic and/or sedative effect as well.

Further new pyridine compounds were prepared according to the method of the invention. For the sake of completeness, their pharmacological data are shown in Table 2.

Table 2

| Compound | $LD_{50}$ mg/kg | $ED_{50}$ mg/kg Tetrabenazine- antagonizing effect | Reserpine- antagonizing effect |
|---|---|---|---|
| N-nicotinoyl-N'-benzyl-piperazine | 1000 | 12.5 | 20.5 |
| N-isonicotinoyl-piperazine | 3000 | 47.5 | 140 |
| N-isonicotinoyl-N'-benzyl-piperazine | 1200 | 31 | 18 |
| N-nicotinoyl-piperazine | 3000 | 20 | 200 |
| N-isonicotinoyl-N'-(p-chlorobenzyl)-piperazine | 1225 | ≈200 | 115 |
| N-nicotinoyl-N'-(p-chlorobenzyl)-piperazine | 680 | 200 | 100 |
| N-(pyridyl-4-acetyl)-N'-benzyl-piperazine | 600 | 1.1 | 27 |
| N-(pyridyl-3-acetyl)-N'-(p-chlorobenzyl)-piperazine | 210 | ≈50 | 50 |
| N-(pyridyl-3-acryloyl)-N'-methyl-piperazine | 2200 | 35 | 120 |
| N-(pyridyl-4-acetyl)-N'-methyl-piperazine | 400 | 43 | 100 |
| N-(pyridyl-3-acetyl)-N'-methyl-piperazine | 520 | 52 | 60 |
| N-(pyridyl-3-acetyl)-N'-benzyl-piperazine | 760 | 47 | 44 |
| N-(pyridyl-4-acetyl)-N'-(p-chlorobenzyl)-piperazine | 210 | ≈40 | ≈40 |
| N-(pyridyl-3-propionyl)-N'-methyl-piperazine | 1500 | 130 | 120 |

In use, the invention can be in the form of pharmaceutical compositions comprising as active ingredient at least one compound of formula I, in admixture with suitable pharmaceutical excipients and carriers.

These pharmaceutical compositions can be solid, e.g. tablets, pills, capsules, suppositories, coated pills, or liquids, such as solutions, emulsions or injectable preparations. The compositions can be suitable for oral, rectal or parenteral administration.

The carriers can be conventional organic or inorganic substances, such as starch, magnesium stearate, talc, stearine, polyalkylene glycols, magnesium carbonate, water, etc.

The pharmaceutical compositions can contain additives, such as emulsifying, stabilizing, flavoring, disintegrating and wetting agents, etc. In addition to the compounds of formula I they can comprise further therapeutically active compounds as well.

The pharmaceutical compositions embodying the invention can be prepared by usual methods known per se in the pharmaceutical industry, by admixing the active ingredient with suitable solid or liquid organic or inorganic pharmaceutical carriers and/or excipients and, if desired, with other therapeutically active compounds.

The dose of the compounds according to the invention for adults can vary between about 20 mg. to about 450 mg. per day.

The invention is further illustrated by the aid of the following Examples which are given for the purpose of illustration only and are not to be construed as limiting the claimed scope of the invention.

EXAMPLE 1

Preparation of N-picolinoyl-piperazine

A mixture of 27.4 g. (0.2 mole) of picolinic acid methylester (or of 30.2 g. (0.2 mole) of picolinic acid ethylester or of 35.8 g. (0.2 mole) of picolinic acid n-butylester) and of 51.6 g. (0.6 mole) of anhydrous piperazine is kept for 25 hours at 135°–145°C. whereafter the excess of piperazine is distilled off from an oil bath of 240°C. The residue is fractionally distilled under a pressure of 0.1 mm Hg. In this way 21–23 g. (55–60 percent) of N-picolinoyl-piperazine are obtained with a melting point of 152°–155°C. (0.1 mm Hg.) The product crystallizes while standing; m.p.: 72°–73°C.

Analysis data (M=191.24)
Calculated, %:   N 21.97
Found, %:        N 21.65

The white crystalline N-picolinoyl-piperazine dihydrochloride melts, after recrystallizing from methanol, at 210°C. with decomposition.

Analysis data (M=264.17)
Calculated, %:   N 15.91   Cl 26.84
Found, %:        N 15.95   Cl 26.36

EXAMPLE 2

Preparation of N-picolinoyl-piperazine

A mixture of 8.6 g. (0.1 mole) of anhydrous piperazine and of 12.2 g. (0.1 mole) of picolinic acid amide is refluxed for 20 hours on an oil bath of 150° to 160°C., whereafter the mixture is fractionally distilled under a pressure of 0.1 mm Hg. In this way 21 g. (55 percent) of N-picolinoyl-piperazine are obtained. The product is identical with the product of Example 1.

EXAMPLE 3

Preparation of N-(6-methyl-picolinoyl)-N'-methyl piperazine

A mixture of 33.0 g. (0.2 mole) of 6-methyl-picolinic acid ethyl ester (or 38.6 g. (0.2 mole) of 6-methyl-picolinic acid n-butylester) and of 20.0 g. (0.2 mole) of N-methylpiperazine is refluxed for 20 hours on an oil bath of 170°–200°C., whereafter the mixture is fractionally distilled off under a pressure of 0.4 mm Hg. 19.5–22 g. (45–50 percent) of light yellow, oily N-(6-methyl-picolinoyl)-N'-methyl piperazine are obtained as the main product.

Analysis data (M=219.29)
Calculated, %: N 19.16
Found, %: N 19.10

After recrystallization from ethanol, the white crystalline N-(6-methyl-picolinoyl)-N'-methyl-piperazine dihydrochloride melts at 247°–248°C. with decomposition.

| Analysis data (M=292.22) | | |
|---|---|---|
| Calculated, %: | N 14.38 | Cl 24.27 |
| Found, %: | N 14.28 | Cl 24.57 |

EXAMPLE 4

Preparation of N-picolinoyl-benzyl-piperazine

A mixture of 15.95 g. (0.1 mole) of picolinic acid hydrochloride and of 17.6 g. (0.1 mole) of N-benzyl-piperazine is kept in an apparatus for 5 hours at 160°–170°C. The obtained N-picolinoyl-N'-benzyl-piperazine monohydrochloride is dissolved in 200 ml. of hot absolute ethanol, and the solution is acidified at 50°–70°C. with absolute ethanol saturated with hydrochloric acid. The pH of the solution is controlled with indicator paper. The mixture is kept for some hours in a refrigerator, whereafter the separated crystals are filtered, washed with 2×20 ml. of ethanol and dried. In this way 20.3 g. (58 percent) N-picolinoyl-N'-benzyl-piperazine dihydrochloride melting at 214°–215°C. with decomposition are obtained. After recrystallizing from absolute ethanol the point of decomposition rises to 216°–217°C.

| Analysis data (M=354.29) | | |
|---|---|---|
| Calculated, %: | N 11.86 | Cl 20.01 |
| Found, %: | N 11.91 | Cl 19.70 |

The N-picolinoyl-N'-benzyl-piperazine maleate ($C_{17}H_{19}N_3O \cdot C_4H_4O_4$) melts at 169°–170°C. while the N-picolinoyl-N'-benzyl-piperazine fumarate ($C_{17}H_{19}N_3O \cdot C_4H_4O_4$) melts at 165° C.

EXAMPLE 5

Preparation of N-picolinoyl-N'-benzyl-piperazine

To a hot solution of 19.1 g. (0.1 mole) of N-picolinoyl-piperazine (prepared according to the method described in Example 1) in 150 ml. of absolute dioxane 2.3 g. of sodium metal powder are added during one hour in portions while stirring. The mixture is left to stand at room temperature for one day. During one hour 0.1 mole of benzyl chloride is dropped into the obtained N-picolinoyl-piperazine-sodium while external cooling with water, whereafter the mixture is heated to boiling. The separated sodium chloride is filtered, the solvent is distilled off and the residue is fractionally distilled under vacuum. In this way 18.2 g. (65 percent) of N-picolinoyl-N'-benzyl-piperazine are obtained with a melting point of 218°–220°C./0.1 mm Hg. The product is identical with the product of Example 4.

EXAMPLES 6 to 10

The compounds enumerated in Table 3 are prepared in compliance with the process as described in the previous Examples.

Table 3

| No. of Example | $R^1$ | $R^2$ | According to Ex. No. | Yield % | B.p. of the base mm Hg. | M.p. of the dihydrochloride, °C. (recrystallizing solvent) | |
|---|---|---|---|---|---|---|---|
| 6 | $CH_3$ | H | 1 | 55–60 | 137–139/0.05 | 160–162 | (b) |
| 7 | H | $CH_3$ | 3 | 45–50 | 130–133/0.1 | 202–204 d. | (e) |
| 8 | H | $CH_2-CH_2-OH$ | 3 | 50–55 | 209–212/0.4 | 210–213 d. | (c) |
| 9 | $CH_3$ | $CH_2-CH_2-OH$ | 3 | 45–50 | 197–199/0.2 | 222–223 | (c) |
| 10 | $CH_3$ | $CH_2-C_6H_5$ | 3 | 70–75 | 240–242/0.8 | 200–202 | (c) | d. = decomposition
(b) = recrystallization: the product is dissolved in methanol and then precipitated with acetone
(c) = recrystallized from 96% ethanol
(e) = recrystallized from absolute ethanol

What we claim is:

1. A pyridine derivative selected from the group consisting of a compound of the formula

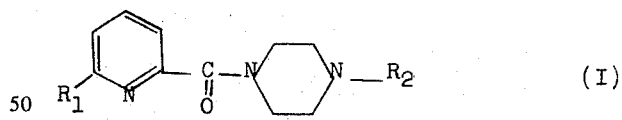 (I)

wherein $R_1$ is a member selected from the group consisting of hydrogen and methyl and $R_2$ is a member selected from the group consisting of hydrogen, methyl, hydroxy ethyl and benzyl, and a therapeutically acceptable acid addition salt thereof.

2. A pyridine derivative as claimed in claim 1, in which $R_1$ is hydrogen.

3. N-picolinoyl-benzyl-piperazine.

* * * * *